US008924749B2

(12) United States Patent
Intrater

(10) Patent No.: US 8,924,749 B2
(45) Date of Patent: Dec. 30, 2014

(54) SOFTWARE CONTROLLED POWER LIMITING IN USB TO SATA BRIDGE

(75) Inventor: Gideon David Intrater, Sunnyvale, CA (US)

(73) Assignee: SMSC Holdings S.A.R.L., Luxembourg (LU)

( * ) Notice: Subject to any disclaimer, the term of this patent is extended or adjusted under 35 U.S.C. 154(b) by 466 days.

(21) Appl. No.: 12/972,773

(22) Filed: Dec. 20, 2010

(65) Prior Publication Data

US 2012/0159208 A1 Jun. 21, 2012

(51) Int. Cl.
*G06F 1/32* (2006.01)
*G06F 1/26* (2006.01)

(52) U.S. Cl.
CPC ............ *G06F 1/3268* (2013.01); *Y02B 60/1246* (2013.01)
USPC ............................ 713/320; 713/300; 713/310

(58) Field of Classification Search
CPC ....... G06F 1/3202; G06F 1/3231; G06F 1/26; G06F 1/206; G06F 1/3228
USPC .......................................... 713/300, 310, 320
See application file for complete search history.

(56) References Cited

U.S. PATENT DOCUMENTS

| 5,828,568 | A * | 10/1998 | Sunakawa et al. .............. 700/79 |
|---|---|---|---|
| 7,219,246 | B2 * | 5/2007 | Julicher et al. ................ 713/322 |
| 7,752,471 | B1 * | 7/2010 | Kolokowsky ................. 713/310 |
| 8,069,277 | B2 * | 11/2011 | Suematsu ....................... 710/14 |
| 2006/0085653 | A1 * | 4/2006 | Bollinger et al. ............. 713/300 |
| 2007/0263250 | A1 * | 11/2007 | Koiwai ......................... 358/1.15 |
| 2008/0040563 | A1 * | 2/2008 | Brittain et al. ................ 711/154 |
| 2011/0238928 | A1 * | 9/2011 | Abe et al. ...................... 711/148 |
| 2012/0084028 | A1 * | 4/2012 | Kumar et al. .................. 702/61 |

* cited by examiner

*Primary Examiner* — Zahid Choudhury
(74) *Attorney, Agent, or Firm* — King & Spalding L.L.P.

(57) ABSTRACT

A Universal Serial Bus (USB) to Serial ATA (SATA) bridge device and method for operating same in a USB connected mass storage subsystem supports software management of power consumption. The USB to SATA bridge estimates power consumption based on known power consumption characteristics of SATA disk drives when performing commands involved in accessing SATA drive, or takes measurements of power consumption during execution of commands to determine when responses to a USB host device are to be delayed. By selectively delaying responses to the USB host device issuing the commands, the USB to SATA bridge manages the rate at which the host issues commands to the USB mass storage subsystem and is thereby able to automatically limit power consumption of the USB mass storage subsystem to that that available over the USB link.

27 Claims, 6 Drawing Sheets

US 8,924,749 B2

SOFTWARE CONTROLLED POWER LIMITING IN USB TO SATA BRIDGE

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The maximum power available to a peripheral subsystem connected to a computer system such as, for example, a disk drive subsystem connected through a Universal Serial Bus (USB) connection to a personal computer (PC), may be a significant factor in the design of the peripheral subsystem.

A USB host device such as, for example, a laptop, notebook, netbook or desktop personal computer (PC); a personal digital assistant (PDA), a cellphone, or other intelligent device interfaces to a USB peripheral subsystem through a host controller and host driver software. The USB host controller communicates with the USB device controller in the USB peripheral subsystem over a multi-wire connection that includes power, ground, and data signals.

For example, a USB-powered disk drive subsystem, including controller and disk drive, may be limited to draw no more than a specified maximum amount of supply current over the USB connection (e.g., 500 or 900 milliamps to comply with the USB 2.0 and 3.0 Specifications, respectively). This limited amount of supply current includes that needed by the peripheral subsystem components used to interface between the USB connection and the electrical signaling standard used by, for example, a disk drive such as a Serial ATA (SATA) compatible hard disk drive or other device in the peripheral subsystem, as well as the power needed for the disk drive itself.

While a USB-connected peripheral subsystem, or other external device (e.g., a USB hub) can supply the operating power needed, doing so requires that such external devices include the necessary power supply circuitry, increasing the cost, complexity, and weight born by a the user.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Devices, methods, and circuits supporting software controlled power limiting in peripheral subsystems connected via a USB to SATA bridge, substantially as shown in and/or described in connection with at least one of the figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate in general to management of power consumption in peripheral subsystems connected to a host device over a bus that provides limited operating power. More specifically, aspects of the present invention relate to devices, systems, and methods that support software controlled power limiting in mass storage peripheral subsystems connected to a host device via a USB to SATA bridge.

Although the following discussion makes frequent reference to the use of the disclosed devices and techniques in embodiments of a USB to SATA bridge, the inventive concepts presented herein are not specifically limited only to that use, and may find application in other electronic devices known now or in the future. The inventive concepts described herein may be employed with other communication links and protocols, without departing from the scope of the present invention.

The term "flash memory" is used herein to refer to any form of non-volatile, solid state memory in which addressable locations to be written must typically be erased before new data is stored, the prior contents of which must be erased in blocks comprising multiple memory addresses, rather than by erasing or overwriting individual memory addresses. While at the time of this application a number of different forms of flash memory are in use including, for example, NAND and NOR flash, and single and multilevel cell flash, the present application is not specifically limited in its use to the currently available forms of non-volatile solid state memory.

It should be noted that although this disclosure describes communication between a "host device" and a "peripheral subsystem" using a communication path complying with communication protocol standards referred to as the Universal Serial Bus (USB) protocol and a SATA storage device interface or transport protocol, the inventive concepts presented are not specifically limited to the use of the USB protocol and a SATA interface, and may be applicable to peripheral devices connected to host devices using other communication means than those examples provided herein, without departing from the scope of the present invention.

Figure 1:
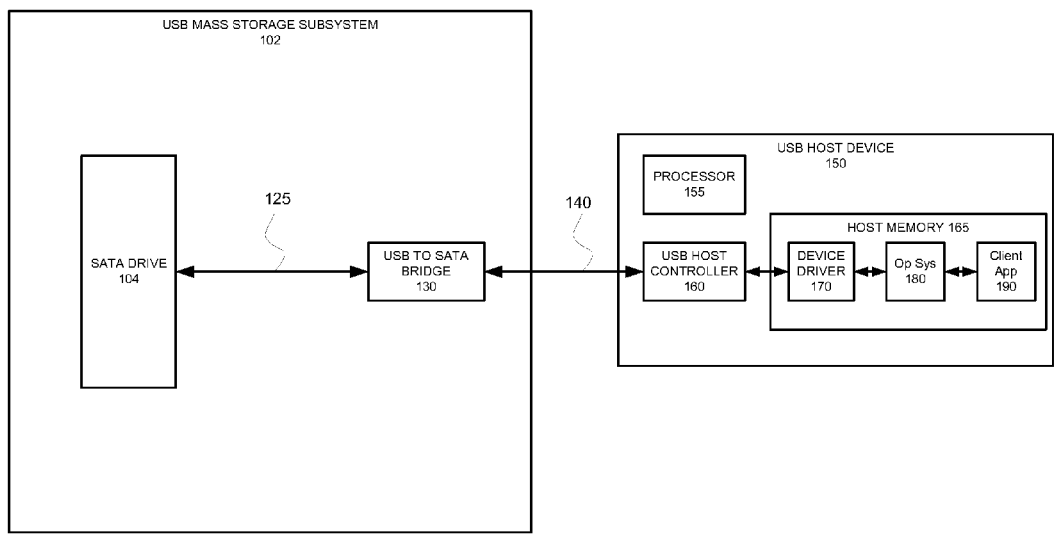
FIG. 1 is a block diagram showing an exemplary prior art USB mass storage device connected by a USB link to a USB host device.

FIG. 1 is a block diagram showing an exemplary prior art USB mass storage device 102 connected by a USB link 140 to a USB host device 150. The USB host device 150 of FIG. 1 comprises processor 155, a USB host controller 160, and a host memory 165 comprising a device driver 170, an operating system (OS) 180, and a client application 190. The processor 155 performs the executable code of client application 190, which may call upon services provided by the operating system (OS) 180. Those services include, for example, access to stored data and executable code in the host memory 155 and other devices connected to the host device 150, such as the USB mass storage subsystem 102. Access to the USB mass storage subsystem 102 is enabled by the USB controller 160, which is managed by the executable code of the device driver 170.

As shown in FIG. 1, the USB mass storage subsystem 102 comprises a SATA compatible disk drive(s) 104 operably coupled by signals of the SATA bus 125 to a USB to SATA bridge 130. Although pictured as a single disk drive, the SATA compatible disk drive(s) 104 may comprise more than one SATA compatible disk drive, such as those available from any manufactured under brand names such as Seagate, Hitachi, Western Digital, Toshiba, Samsung, and many others.

The USB to SATA bridge 130 communicates with the host device 150 via the USB link 140, and with the SATA compatible disk drive(s) 104 via the SATA bus 125. Accesses to information stored on the USB mass storage subsystem 102 originating from operating system 180 or client application 190 are communicated via the device driver 170 over USB link 140 to the USB to SATA bridge 130, which communicates the commands and/or data to the SATA drive(s) 104. Status information and/or data from the SATA drive(s) 104 is communicated over SATA bus 125 to the USB to SATA bridge 130, which then communicates that information to the USB host device 150 via USB link 140. The USB host controller 160 receives the status information and/or data from the USB mass storage subsystem 102, and passes it to the device driver 170 and on to the operating system 180 and/or client application 190.

The USB link 140 may, for example, operate according to the USB 3.0 Revision 1.0 or later specification. Details of the USB 3.0 Revision 1.0 Specification are described in the document "Universal Serial Bus 3.0 Specification Rev. 1.0" released Nov. 12, 2008, which may be found at http://www.usb.org, and which is hereby incorporated herein by reference in its entirety. The Serial ATA (SATA) interface 125 may operate according to, for example, the Serial ATA Revision 2.6 specification dated Feb. 15, 2007 or the later Serial ATA Revision 3.0 specification dated Jun. 2, 2009, which have been developed under the auspices of the Serial ATA International Organization. The reader may wish to refer to the Serial ATA AHCI 1.3 Specification, ratified Jun. 26, 2008, for details on the design of a conventional SATA host controller, which is described in detail in the document "Serial ATA Advanced Host Controller Interface (AHCI) 1.3" available at http://developer.intel.com, and which is hereby incorporated herein by reference in its entirety.

The power required for operation of the USB mass storage subsystem 102 must be provided either by the USB host device 150 via USB link 140, by a USB hub device (not shown) in the path leading to the USB mass storage subsystem 102, or by a separate power supply internal to or connected to USB mass storage subsystem 102. Whether the USB mass storage subsystem 102 is able to operate solely from the pre-defined amount of power available over the USB link 140, or requires a separate power supply depends upon whether the peak/worst case current/power consumption of the USB mass storage subsystem 102 exceeds that available via the USB link 140. Although peak/worst case current/power consumption of the USB mass storage device 102 may occur infrequently, the design of the USB mass storage subsystem 102 must provide separate power, if the peak/worst case current/power consumption during operation of the USB mass storage subsystem 102 ever exceeds that available via the USB link 140.

Figure 2:
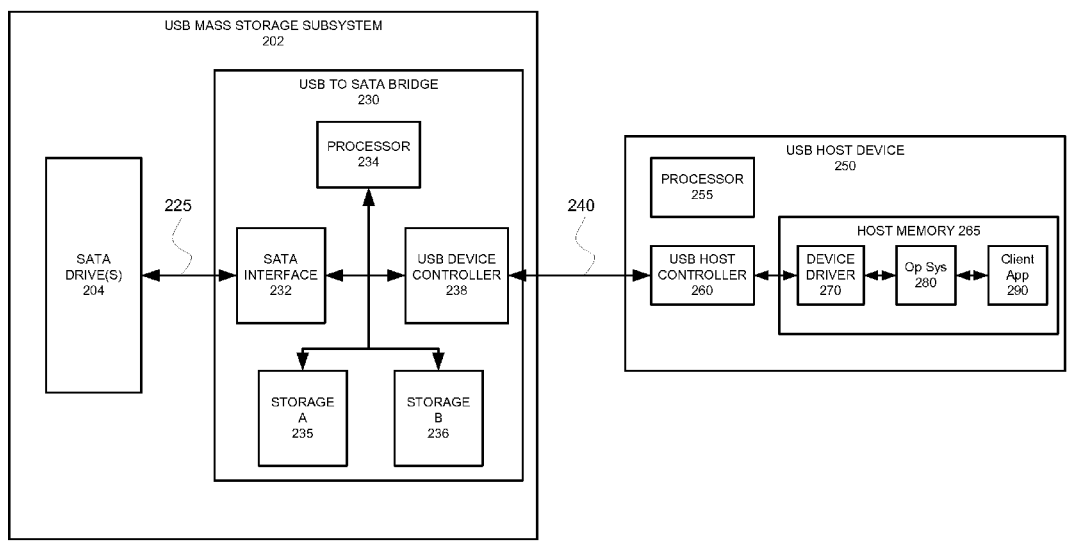
FIG. 2 is a block diagram showing an exemplary USB mass storage subsystem operably coupled by a USB link to a USB host device, where the USB mass storage subsystem comprises a USB to SATA bridge supporting software controlled power limiting, in accordance with a representative embodiment of the present invention.

FIG. 2 is a block diagram showing an exemplary USB mass storage subsystem 202 operably coupled by a USB link 240 to a USB host device 250, where the USB mass storage subsystem comprises a USB to SATA bridge 230 supporting software controlled power limiting, in accordance with a representative embodiment of the present invention. The USB host device 250 of FIG. 2 comprises processor 255, a USB host controller 260, and a host memory 265. Although shown as separate elements, the processor 255, USB host controller 260, and host memory 265 may be combined into one element, or into multiple elements each having some sub-combination of the functionality of the processor 255, the USB host controller 260, and the host memory 265, without departing from the scope of the present invention. As shown in the exemplary embodiment of FIG. 2, the host memory 265 comprises a device driver 270, an operating system (OS) 280, and a client application 290. The processor 255 performs the instructions of client application 290 and operating system 280. The operating system 280 may provide services employed by the client application 290. As in FIG. 1, services provided by the operating system 280 may include, for example, access to data and executable code in the host memory 255 and other devices connected to the host device 250, such as the USB mass storage subsystem 202. Access to the USB mass storage subsystem 202 is enabled by the USB controller 260, which is managed by the executable code of the device driver 270.

The illustration of FIG. 2 shows that the exemplary USB mass storage subsystem 202 comprises SATA compatible disk drive(s) 204 operably coupled by signals of the SATA bus 225 to the USB to SATA bridge 230. While pictured as a single disk drive, the SATA compatible disk drive(s) 204 may comprise more than one SATA compatible disk drive, such as those manufacturers mentioned above. It should be noted that the term "SATA compatible disk drive" as used herein refers to any mass storage device that communicates with a host device using a SATA transport protocol, whether or not the media on which data is stored is moving magnetic physical media such as, for example, a disk platter, or solid state memory such as, for example, flash-type memory.

The USB to SATA bridge 230 communicates with the host device 250 via the USB link 240, and with the SATA compatible disk drive(s) 204 via the SATA bus 225. Accesses to information stored on the USB mass storage subsystem 202 originating from Operating System 280 or client application 290 are communicated via the device driver 270 and USB host controller 260 over USB link 240 to the USB to SATA bridge 230, which communicates the commands and/or data to the SATA drive(s) 204. With regard to the SATA drive(s) 204, the USB to SATA bridge 330 acts as a SATA host bus adapter (HBA). Status information and/or data from the SATA drive(s) 204 is communicated over SATA bus 225 to the USB to SATA bridge 230, which then communicates that information to the USB host device 250 via USB link 240. The USB host controller 260 receives the status information and/or data from the USB mass storage subsystem 202, and passes the status information and/or data to the device driver 270, which communicates the status information/data on to the operating system 280 and/or the client application 290.

As mentioned above, the USB mass storage subsystem 202 of FIG. 2 includes a USB to SATA bridge 230 that operates in accordance with a representative embodiment of the present invention. The exemplary USB to SATA bridge 230 shown in FIG. 2 comprises a SATA interface 232, a processor 234, a storage A 235, a storage B 236, and a USB device controller 238. The USB to SATA bridge 230, although shown in FIG. 2 as having s single processor 234, a single storage A 235, and a single storage B 236, may comprise more than one processor and more than two storage elements, without departing from the scope of the present invention.

The SATA interface 232 of FIG. 2 appears to the SATA drive(s) 204 as a SATA host bus adapter (HBA). Commands to be sent to the SATA drive(s) 204 are received by the USB to SATA bridge 230 from the USB host 250 via the USB link 240.

As discussed above, FIG. 2 also illustrates that the USB to SATA bridge 230 of a representative embodiment of the present invention includes storage A 235 and storage B 236. In one representative embodiment of the present invention, the storage A 235 is writable persistent memory such as, for example, flash-type memory used for storage of executable code for processor 234 and/or storage of parameters used by the processor 234. The storage B 236 of a representative embodiment of the present invention may comprise read/write random access memory used for temporary storage of data read from or to be written to the SATA drive(s) 204 during execution of commands. Although storage A 235 and storage B 236 are illustrated in FIG. 2 as being part of the USB to SATA bridge 230, storage A 235 and storage B 236 of a representative embodiment of the present invention may be separate from the USB to SATA bridge 230, which may include a memory interface (not shown) to enable the USB to SATA bridge 230 to use external memory devices of varying capacities and/or produced by any of a variety of manufacturers.

Storage A 235 of a representative embodiment of the present invention may store one or more parameters representing various operating characteristics of, for example, one or more SATA compatible disk drives usable with the USB to SATA bridge 230, and may also include one or more parameters representing operating characteristics of the USB to SATA bridge 130 itself. Storage A 235 may, for example, comprise flash-type or any other suitable form of memory. Examples of parameters used in the calculation of estimate(s) of current/power consumption of the USB mass storage subsystem 202 may include, for example, current/power consumption behavior of one or more compatible SATA disk drive(s) when performing the various operations normally involved in responding to commands from the host device 250. The parameters used in the estimation/calculation of power consumption may be stored in storage A 235 of the USB mass storage subsystem at the time of manufacture of the USB to SATA bridge 230 using representative values of the parameters taken during operation in a lab environment, or the parameters may be dynamically measured during the operation of the complete USB mass storage subsystem 202 (e.g., self-calibrated). The parameters may be updated from the host device 250, or by other means, any time thereafter in order to support updated operating characteristics of known SATA drive(s), or for new SATA drive(s) 204 introduced after production of the USB to SATA bridge 230 or USB mass storage subsystem 202.

In one representative embodiment of the present invention, the USB to SATA bridge 230 of the USB mass storage subsystem 202 calculates a series of estimates of power consumption of the USB mass storage subsystem 202 as commands received from the USB host device 250 are performed. The calculation of such power consumption estimates uses as input, for example, the commands issued to and/or previously processed by the USB mass storage subsystem 202, and the SATA drive parameters stored in, for example, storage A 235, discussed above. The USB to SATA bridge 230 may also include in its estimate(s) of power consumption the amount of data transferred to and/or from the SATA drive(s) 204 from/to the host device 250 by the USB to SATA bridge 230. Using the estimate(s) of power consumed during execution of each command, the USB to SATA bridge 230 manages the issuance of additional commands by the host device 250, by delaying transmission to the host device 250 of acknowledgements/responses for completions of earlier received commands. Delaying transmission to the USB host device 250 of an acknowledgement/response for an outstanding command forces the USB host device 250 to wait before sending the next command to the USB mass storage subsystem 202. By delaying transmission of additional commands from host device 250, a representative embodiment of the present invention is able to manage the rate at which commands are sent to the USB mass storage subsystem 202 by the host device 250, and thereby manage the level of power consumption of the USB mass storage subsystem 202.

For example, power consumption during performance of various behaviors/actions of one or more different models of SATA disk drives is able to be quantized. Such power consumption information may be determined by the manufacturer of the SATA drives, for example, based on design criteria or through laboratory testing and characterization. Parameters representing, for example, current and/or power consumption during actions including, but not limited to, power-on but idle, spin-up, sector and/or track read and/or write, and other drive behaviors/actions may be saved in persistent storage accessible to the USB to SATA bridge 230, such as storage A 235, discussed above. Such stored parameters may be used by the USB to SATA bridge 230 to determine estimate of power consumption of the USB mass storage subsystem 202 before, during, or after execution of each of command received by the USB to SATA bridge 230 from the USB host device 250.

The USB to SATA bridge 230 may compare such estimates to a predetermined maximum available power/maximum allowable power consumption known to the USB to SATA bridge 230, based upon the maximum power available via the USB link 240. In a representative embodiment of the present invention operating over a USB link 240 in accordance with, for example, the USB 3.0 Revision 1.0 Specification, the maximum amount of current available to the USB mass storage subsystem 202 via the USB link 240 may be assumed by the USB to SATA bridge 230 to be 900 milliamps. When operating over a USB link 240 in accordance with the USB 2.0 Specification, however, the maximum amount of current available to the USB mass storage subsystem 202 via the USB link 240 may be assumed by the USB to SATA bridge 230 to be only 500 milliamps. A representative embodiment of the present invention may automatically limit the power consumed by the system to the maximum allowed by the USB specification applicable to the USB link 240. Information identifying the maximum available power/maximum allowable power consumption may be pre-programmed into persistent memory, written into volatile memory at start-up of the USB mass storage subsystem, or hardcoded into software/firmware of the USB to SATA bridge 230.

Figure 3:
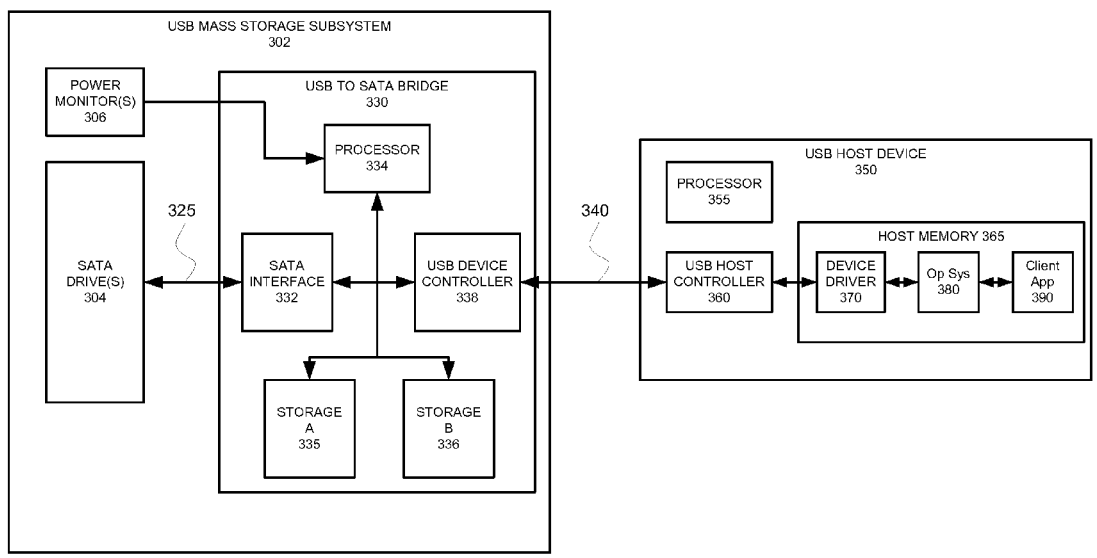
FIG. 3 is a block diagram showing another exemplary USB mass storage subsystem operably coupled by a USB link to a USB host device, where the USB mass storage subsystem comprises another USB to SATA bridge supporting software controlled power limiting, in accordance with a representative embodiment of the present invention.

FIG. 3 is a block diagram showing another exemplary USB mass storage subsystem 302 operably coupled by a USB link 340 to a USB host device 350, where the USB mass storage subsystem comprises another USB to SATA bridge 330 supporting software controlled power limiting, in accordance with a representative embodiment of the present invention. The USB host device 350 of FIG. 3 comprises processor 355, a USB host controller 360, and a host memory 365, which may performs functions similar to, for example, the processor 255, the USB host controller 260, and the host memory 265, respectively, as discussed above with respect to FIG. 2. As previously mentioned, the separate elements identified as the processor 355, the USB host controller 360, and the host memory 365 may be combined into one entity, or into multiple entities each having the functionality of a subset of the processor 355, the USB host controller 360, and the host memory 365, without departing from the scope of the present invention. The host memory 365 of FIG. 3 is also illustrated as comprising a device driver 370, an operating system (OS) 380, and client application 390. The processor 355 performs the executable instructions that make up the client application 390 and the operating system 380 that may provide various services to the client application 390. Examples of services that may be provided by the operating system 380 have been discussed above with respect to FIGS. 1 and 2. Access to the USB mass storage subsystem 302 is enabled by the USB controller 360, which is managed by the executable code of the device driver 370, as in FIG. 2.

In the representative embodiment of the present invention shown in FIG. 3, the circuitry of the USB mass storage subsystem 302 may include functionality to measure/monitor power consumption, shown in FIG. 3 as power monitor(s) 306, to enable the measurement/monitoring of current/power consumption of the USB mass storage subsystem 302 as a whole, or of any or all of the subassemblies or components of the USB mass storage subsystem 302. The power monitor(s) 306 may comprise circuitry to measure indicators of current/power consumption at one or more points in the USB to SATA bridge 330 and/or the USB mass storage subsystem 302, to permit the processor 355 to calculate the current/power consumption of a portion or all of the USB mass storage subsystem 302. Such measurements may then be used to calculate one or more estimates of current/power consumption of the USB mass storage subsystem 302, in order to limit current/power consumption to that permitted from the USB link 340.

The illustration of FIG. 3 shows that the exemplary USB mass storage subsystem 302 comprises SATA compatible disk drive(s) 304 operably coupled by SATA bus 325 to the USB to SATA bridge 330. The SATA compatible disk drive(s) 304 may comprise one or more SATA compatible disk drives from, for example, any of the manufacturers previously named. It should again be noted that the term "SATA compatible disk drive" as used herein is intended to refer mass storage devices that communicate with host devices using a SATA transport protocol, regardless of whether the media on which data is stored is magnetic media such as a disk platter, or solid state memory such as, for example, flash-type memory.

FIG. 3 illustrates that the USB to SATA bridge 330 communicates with the host device 350 via the USB link 340, and with the SATA compatible disk drive(s) 304 via the SATA bus 325. The operating system 380 or client application 390 accesses information stored on the USB mass storage subsystem 302 via the device driver 370 and USB host controller 360 using USB link 340 and the USB to SATA bridge 330. The USB to SATA bridge 330 receives Status information and/or data from the SATA drive(s) 304 over SATA bus 325, and then communicates that information to the USB host device 350 via USB link 340. The USB host controller 360, managed by device driver 370, receives the status information and/or data from the USB mass storage subsystem 302. The device driver 370 then passes the status information and/or data to the operating system 380 and/or the client application 390.

The USB to SATA bridge 330 of the USB mass storage subsystem 302 of FIG. 3 operates similarly, in many respects, to the embodiment discussed above with respect to FIG. 2. The exemplary USB to SATA bridge 330 shown in FIG. 3 comprises a SATA interface 332, a processor 334, a storage A 335, a storage B 336, and a USB device controller 338 that may function in a manner similar to that of the SATA interface 232, the processor 234, the storage A 235 and storage B 236, and the USB device controller 238 of FIG. 2, respectively. As mentioned above, however, the USB to SATA bridge 330 of FIG. 3 includes power monitor 306, which represents functionality used to measure current/power consumed by one or more portions of the USB mass storage subsystem 202.

FIG. 3 shows that the USB to SATA bridge 330 of a representative embodiment of the present invention also includes storage A 335 and storage B 336. As described above, storage A 235 may be writable persistent memory such as flash or other type memory used for storage of executable code for processor 334 and/or storage of parameters used by the processor 334. The storage B 336 may comprise read/write random access memory used for temporary storage of data read from or to be written to the SATA drive(s) 304 during operation of the USB mass storage subsystem 302. Once again, it should be noted that storage A 335 and storage B 336, although illustrated in FIG. 2 as being part of the USB to SATA bridge 330, may be separate from the USB to SATA bridge 330, which may comprise a memory interface (not shown) that enables the USB to SATA bridge 330 to operably connect to non-volatile and volatile memory devices external to the USB to SATA bridge 330.

Similar to the embodiment shown in FIG. 2, the storage A 335 of the representative embodiment of FIG. 3 may store one or more parameters representing various operating characteristics of SATA compatible disk drives usable with the USB to SATA bridge 330, and may also include parameter(s) representing operating characteristics of the USB to SATA bridge 330. Storage A 335 may comprise, for example, flash-type or any other suitable form of memory. Illustrative but non-limiting examples of parameters that may be used in the calculation of current/power consumption of the USB mass storage subsystem 302 include, for example, calibration or scale factors for power monitor(s) 306, the amount of power consumed by the USB to SATA bridge 330 to process a command received from the USB host device 350, and the amount of power consumed by the USB to SATA bridge 330 to process data transferred between the USB host device 350 and the SATA device (e.g., SATA drive(s) 304). Additional parameters that may be used in the calculation include, for example, the amount of power consumed by the SATA device(s) 304 to process a command received from the USB to SATA bridge 330 and perform the set-up operations for the transfer of data to or from the SATA device(s) (e.g., SATA drive(s) 304), and the power consumed by the SATA device(s) (e.g., SATA drive(s) 304) to process data transferred to or from the USB to SATA bridge 330. It should be noted that a different number or combination of parameters may be used in the estimation of power consumption, without departing from the spirit and/or scope of the present invention. As in the embodiment described above with respect to FIG. 2, parameters used in the calculation of current/power consumption from measurements from the power monitor(s) 306 may be stored in. storage A 335 of the USB mass storage subsystem at the time of manufacture of the USB to SATA bridge 330 using representative values of the parameters taken during operation in a lab environment, or the parameters may be dynamically measured during the operation of the complete USB mass storage subsystem 302 (e.g., self-calibrated). Such parameters may be updated from the host device 350 or otherwise, at any time in order to support known SATA drive(s), or new SATA drive(s) 304 introduced after production of the USB to SATA bridge 330 or USB mass storage subsystem 302.

In the representative embodiment of the present invention illustrated in FIG. 3, the USB to SATA bridge 330 of the USB mass storage subsystem 302 makes a series of measurements of current/power consumption of the USB mass storage subsystem 302 while commands received from the USB host device 350 are performed. The current/power consumption measurements are then used by the USB to SATA bridge 330 to manage the transmission of additional commands by the host device 350, by delaying transmission of acknowledgements/responses to the host device 350 for the most recently completed commands. By delaying transmission of an acknowledgement/response to the USB host device 350, the USB to SATA bridge 330 forces the USB host device 350 to wait before sending the next command to the USB mass storage subsystem 302. This allows the USB to SATA bridge 330 to manage the rate at which commands are sent to the USB mass storage subsystem 302 by the host device 350, and thereby manage the level of current/power consumption of the USB mass storage subsystem 302.

For example, in the representative embodiment illustrated in FIG. 3, current/power consumption during performance of the USB mass storage subsystem 302 can be measured. The USB to SATA bridge 330 may compare such measurements to a predetermined maximum available current/maximum allowable power consumption known to the USB to SATA bridge 330, based upon the maximum power available via the USB link 340. Information identifying the maximum available current/maximum allowable power consumption may be pre-programmed into persistent memory, written into volatile memory at start-up of the USB mass storage subsystem, or hardcoded into software/firmware of the USB to SATA bridge 330, for example.

Figure 4:
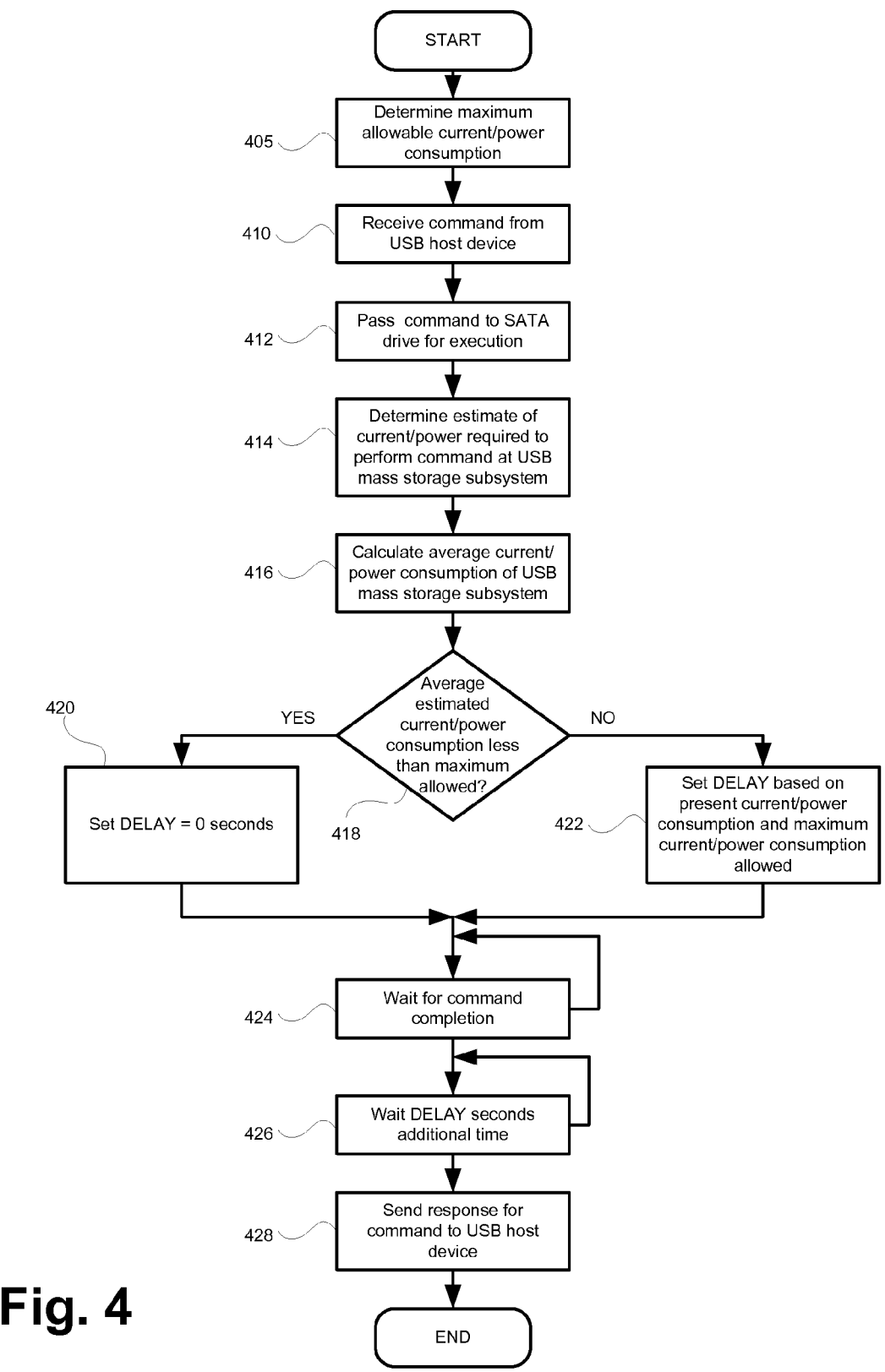
FIG. 4 is a flowchart illustrating an exemplary method of operating a USB to SATA bridge such as, for example, the USB to SATA bridge of FIG. 2 that supports software controlled power limiting, in accordance with a representative embodiment of the present invention.

FIG. 4 is a flowchart illustrating an exemplary method of operating a USB to SATA bridge such as, for example, the USB to SATA bridge 230 of FIG. 2 that supports software controlled power limiting, in accordance with a representative embodiment of the present invention. The following description of the method of FIG. 4 makes reference to the elements of FIG. 2. The activity of FIG. 4 begins at block 405, when the USB mass storage subsystem 202 determines he maximum allowable current/power consumption. This may occur, for example, during establishment of communication between the USB host device 250 and the USB mast storage subsystem 202 over USB link 240. Next, at block 410, the operational USB mass storage subsystem such as the USB mass storage subsystem 202 of FIG. 2 receives a command from the USB host device 250 via USB link 240. The command results from an attempt by a client application or operating system, such as the client application 290 or operating system 280 of USB host device 250 of FIG. 2 to access the USB mass storage subsystem 202, for example. As described above with respect to FIG. 2, the access to the USB mass storage subsystem 202 originates with the client application 290 or operating system 280 and the command transmitted to the USB mass storage subsystem 202 via USB link 240 is generated by device driver 270 and transmitted by the USB host controller 260. After the command is received by the USB to SATA bridge 230, the method of FIG. 4, at block 412, passes the command to the SATA drive(s) 204 for execution. Next, at block 414, the USB to SATA bridge 230 determines an estimate of current/power required to perform the command at the USB mass storage subsystem 202. As described above, this estimate may be calculated using one or more parameters for the SATA drive on which the command will be executed. The USB to SATA bridge 202 then calculates a value of the average current/power consumption of the USB mass storage subsystem 202.

Next, at block 418, the USB to SATA bridge 230 determines whether the averaged estimated current/power consumption is less than the maximum current/power consumption permitted by the USB link 240. If the USB to SATA bridge 230 determines that the average current/power consumption of the USB mass storage subsystem is less than the maximum allowed, the USB to SATA bridge 230 sets a value indicating the amount of time to delay transmission of a response following completion of the current command to the USB host device 250, to zero. If, on the other hand, the USB to SATA bridge 230 determines that the average current/power consumption of the USB mass storage subsystem is not less than the maximum allowed then, at block 422, the USB to SATA bridge 230 sets the value indicating the amount of time to delay transmission of a response to the USB host device 250 to a sufficient amount of time to maintain the average current/power consumption of the USB mass storage subsystem 202 at or below the maximum current/power consumption permissible over the USB link 240. The amount of delay before responding to the USB host device 250 is calculated based upon any of a number of parameters including, for example, the present average current/power consumption and the maximum permissible current/power consumption over the USB link 240, and may include safety margin, hysteresis, and/or error tolerance parameters.

Following the setting of the amount of delay before response to the command, at block 424, the USB to SATA bridge 230 waits for command completion. Following completion of the command, at block 426, the USB to SATA bridge 230 then waits the amount of response delay time determined above. When the response delay is completed, the USB to SATA bridge 230 then transmits the response for the command to the USB host device 250, and the method of FIG. 4 begins again at block 410 following the receipt of the next command.

Figure 5:
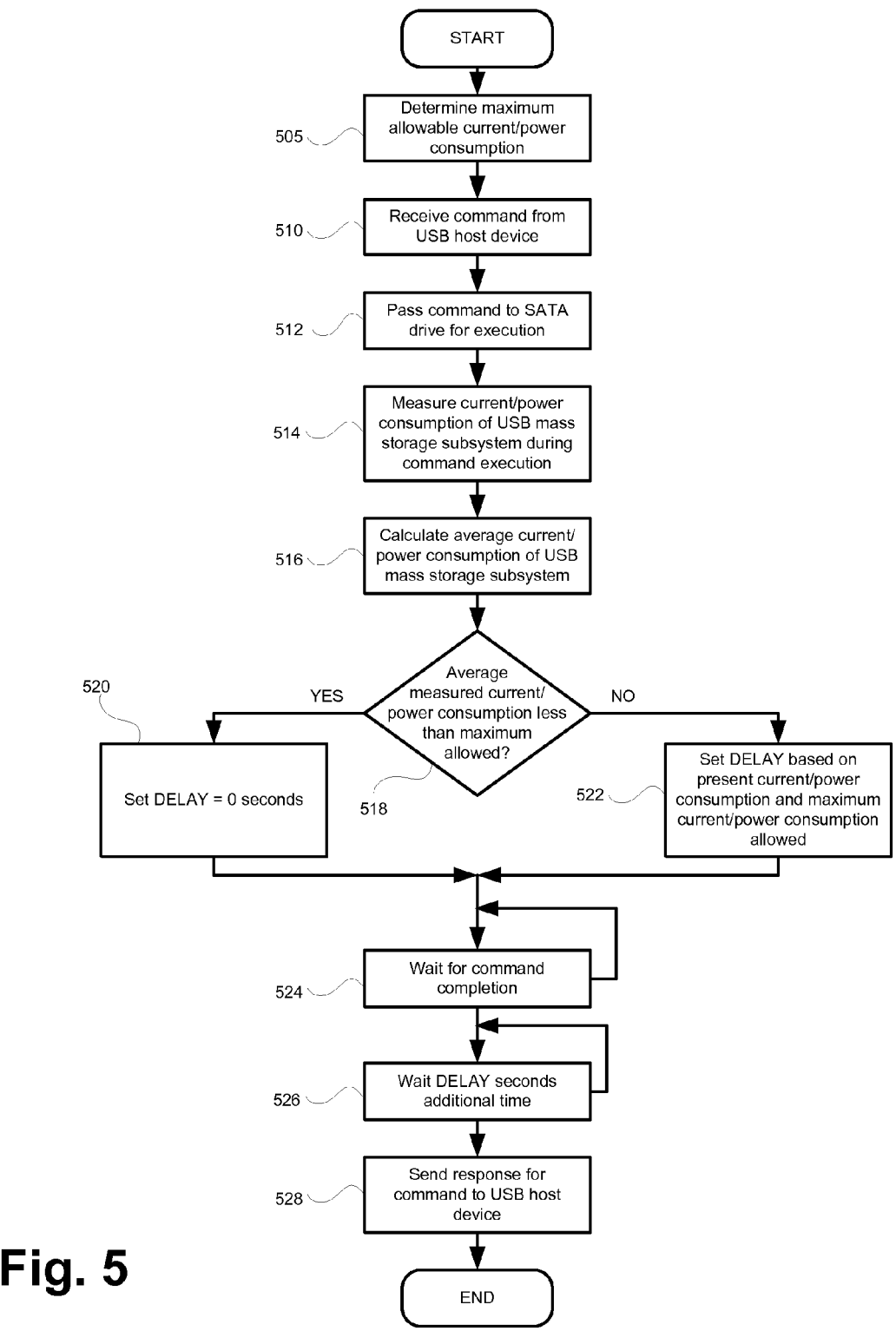
FIG. 5 is a flowchart illustrating an exemplary method of operating a USB to SATA bridge such as, for example, the USB to SATA bridge of FIG. 3 that supports software controlled power limiting, in accordance with another representative embodiment of the present invention.

FIG. 5 is a flowchart illustrating an exemplary method of operating a USB to SATA bridge such as, for example, the USB to SATA bridge 330 of FIG. 3 that supports software controlled power limiting, in accordance with another representative embodiment of the present invention. The following description of the method of FIG. 5 makes reference to the elements of FIG. 3, and is similar in many ways to the method of FIG. 4, except that measurements rather than estimates of current/power consumption are used in managing power consumption of a USB mass storage subsystem such as that shown in FIG. 3. The method of FIG. 5 begins at block 505, when the USB mass storage subsystem 302 determines the maximum allowable current/power consumption. Next, at block 510, the USB mass storage subsystem 302 of FIG. 3 receives a command from a USB host device such as the USB host device 350 via USB link 340. As in the method of FIG. 4, the command received by the USB mass storage subsystem 302 results from an attempt by a client application or operating system, such as the client application 390 or operating system 380 of USB host device 350 to access the USB mass storage subsystem 302. As described above with respect to FIG. 3, a USB host controller such as the USB host controller 360 of FIG. 3 transmits a command generated by device driver 370 in response to the access to the USB mass storage subsystem 302 by the client application 390 or operating system 380.

At block 512, the command received by the USB to SATA bridge 330 is passed to the SATA drive(s) 304 for execution. Next, at block 514, the USB to SATA bridge 330, for example, makes one or more measurement(s) of the current/power consumption at the USB mass storage subsystem 302 during the execution of the command. As previously described, the measurement of current/power consumption may be based upon measurement(s) of one or more portions, or all, of the circuitry of the USB mass storage subsystem 302. Then, at block 516, the USB to SATA bridge 302 calculates an average current/power consumption of the USB mass storage subsystem 302.

Next, at block 518, the method of FIG. 5 determines whether the average measured current/power consumption is less than the maximum current/power consumption permitted when power for the operation of the USB mass storage subsystem 302 is provided via the USB link 340. If the method of FIG. 5 determines at block 518 that the average current/power consumption of the USB mass storage subsystem 302 is less than or equal to the maximum allowed, the method of FIG. 5, at block 520, sets to zero the amount of time to delay transmission of a response following completion of the current command to the USB host device 350. If instead, at block 518, the method of FIG. 5 determines that the average current/power consumption of the USB mass storage subsystem 302 is greater than the maximum allowed, then at block 522, the method sets the time to delay transmission of a response to the USB host device 350 to an amount of time sufficient to maintain the average current/power consumption of the USB mass storage subsystem 302 at or below the maximum current/power consumption permissible over the USB link 340. The amount of delay before responding to the USB host device 350 is calculated based upon any of a number of parameters including, for example, the present average current/power consumption, the maximum permissible current/power consumption over the USB link 340, the energy storage capacity of the circuitry of the USB mass storage subsystem 302, and may also include parameters for a safety margin, hysteresis, and/or error tolerance parameters.

Once the amount of time to delay before transmitting a response to the command has been determined, the method of FIG. 5 waits for command completion, at block 524. Following completion of the current command, at block 526, the method of FIG. 5 then waits the amount of response delay time determined above. When the response delay has been completed (at block 528), the method of FIG. 5 transmits the response for the current command to the USB host device 350, and the method of FIG. 5 is ready to begin again at block 510 to process a subsequent command.

Figure 6:
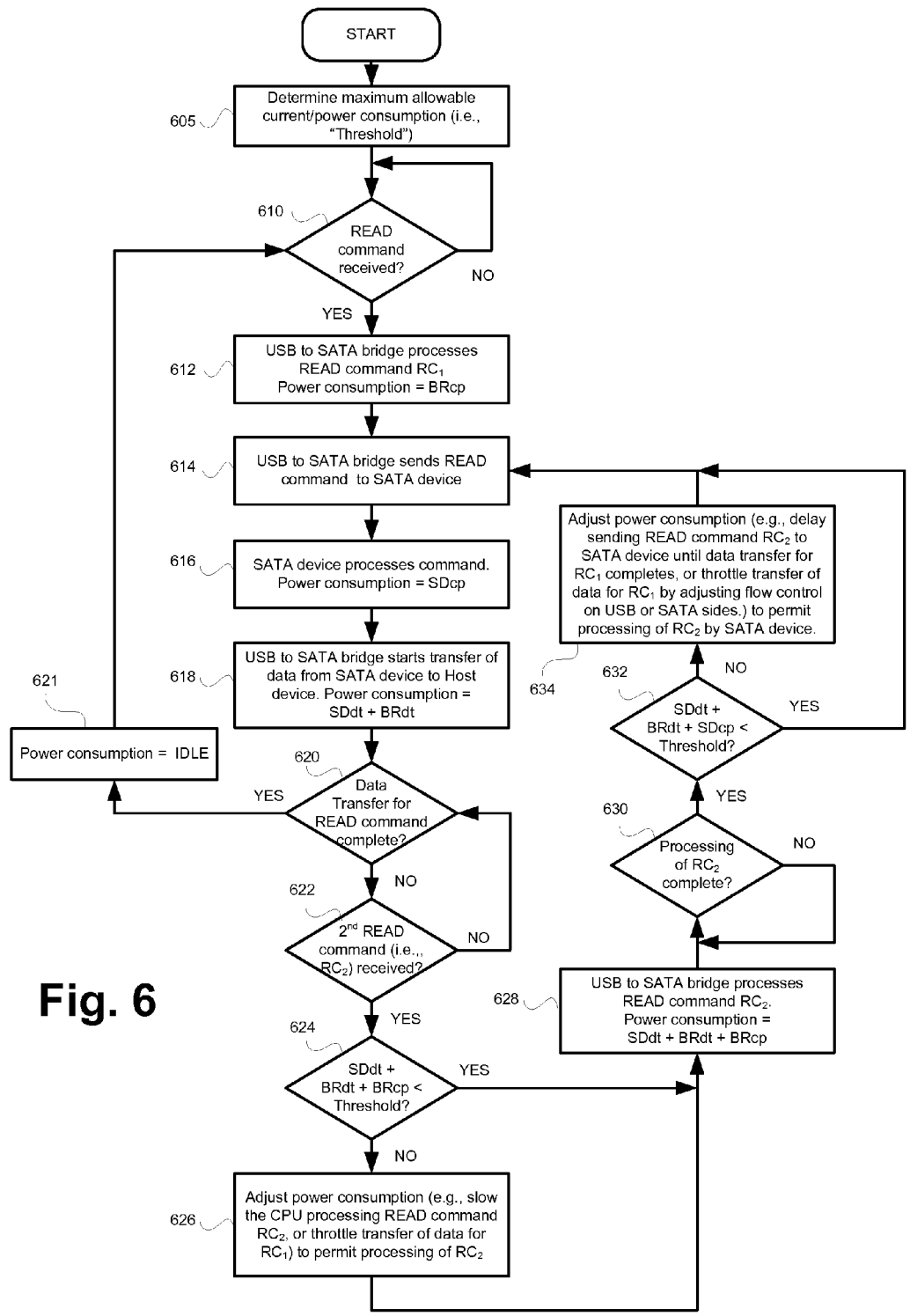
FIG. 6 is a flowchart illustrating another exemplary method of operating a USB to SATA bridge such as, for example, the USB to SATA bridge of FIG. 3 that supports software controlled power limiting, in accordance with a representative embodiment of the present invention.

FIG. 6 is a flowchart illustrating another exemplary method of operating a USB to SATA bridge such as, for example, the USB to SATA bridge 330 of FIG. 3 that supports software controlled power limiting, in accordance with a representative embodiment of the present invention. The following description of the method of FIG. 6 makes reference to the elements of FIG. 3, and is similar in some ways to the methods of FIG. 4 and FIG. 5. While the illustration of FIG. 6 shows the actions in processing "READ" commands originating from a USB host device, this is for purposes of illustration only, as aspects of the present invention may be applicable to other commands from a USB host device such as the USB host device 350. Further, it should be noted that the steps or actions illustrated in FIG. 6 may be performed by one processor, or by two or more processors operating in cooperation, without departing from the spirit and scope of the present invention.

The method of FIG. 6 begins at block 605, when a USB mass storage system like the USB mass storage subsystem 302 begins operation following power-up. At that point, following initialization, the USB mass storage system is assumed to be idle. As part of the power-up and initialization, the USB mass storage subsystem of a representative embodiment of the present invention determines the maximum allowable current draw/power consumption, referred, to in FIG. 6 and below as the "Threshold" parameter. As previously discussed above, the maximum available/allowable current draw/power consumption may depend on the requirements of the specification according to which the USB link 340 operates. That is, in a representative embodiment of the present invention powered by and communicating via a USB 2.0 link, the "Threshold" parameter may be set to, for example, a value representing 500 milliamps of current or 2500 milliwatts (mw) of power, while in a representative embodiment of the present invention powered by and communicating via a USB 3.0 link the "Threshold" parameter may be set to, for example, a value representing 900 milliamps of current or 4500 mw of power. It should be understood that either current draw or power consumption may be used in operation of the method of FIG. 6 without departing from the spirit and scope of the present invention. In the following illustrative example, power consumption in milliwatts will be used without representing a specific limitation of the present invention.

Following start-up, at block 610, the USB mass storage subsystem 302 of FIG. 3 loops, waiting to receive a "READ" command via USB link 340 from a USB host device such as the USB host device 350. As in the method of FIG. 4, the command received by the USB mass storage subsystem 302 results from an attempt by a client application or operating system, such as the client application 390 or operating system 380 of USB host device 350 to access the USB mass storage subsystem 302. As described above with respect to FIG. 3, a USB host controller such as the USB host controller 360 of FIG. 3 transmits a command generated by device driver 370 in response to the access to the USB mass storage subsystem 302 by the client application 390 or operating system 380.

Next, at block 612, the USB to SATA bridge 330 processes the READ command, which will be represented herein as READ command $RC_1$. During processing of the READ command $RC_1$, the USB to SATA bridge 330 may, for example, operate with a power consumption represented herein as BRcp (mw). When finished processing the READ command $RC_1$, the USB to SATA bridge 330, at block 614, then sends the READ command $RC_1$ to a SATA device such as, for example, the SATA drive(s) 304 of FIG. 6, for execution by the SATA device.

Next, at block 616, the SATA device (e.g., SATA drive(s) 304) processes the READ command $RC_1$. The processing of the READ command RC, by the SATA device consumes an amount of power which is represented herein as, SDcp (mw). When the SATA device completes processing of the READ command $RC_1$ and is ready to transfer the desired data indicated by the READ command $RC_1$, the USB to SATA bridge, at block 618, starts the transfer of the data from the SATA device (e.g., SATA drive(s) 304) to the USB host device (e.g., USB host device 350). During transfer of data from the SATA device to the USB host device, power consumption may be, for example, the power consumed by the SATA device during data transfer, represented herein as SDdt, plus the power consumed by the USB to SATA bridge during data transfer, represented herein as BRdt, for a total power consumption of (SDdt+BRdt) (mw).

At block 620, the method of FIG. 6 then waits for the transfer of data between the SATA device and the USB host device (e.g., SATA drive(s) 304 and USB host device 350, resp.) to complete. If it is determined that the data transfer is not yet complete, the USB to SATA bridge 330 may check, at block 622, whether a second READ command, represented herein as $RC_2$, has been received. If, at block 622, it is determined that a second READ command $RC_2$ has not been received, the method of FIG. 6 loops back to again check for completion of the data transfer for the READ command $RC_1$. However, if it is determined, at block 620, that the data transfer for the READ command $RC_1$ has completed, the method of FIG. 6 returns to an idle condition, with a power consumption represented herein as "IDLE" (mw).

If, at block 622, it is determined that a second READ command, $RC_2$, has been received by the USB to SATA bridge 330, the USB to SATA bridge then determines whether the present power consumption of the USB mass storage system (e.g., USB mass storage system 302), plus the power that would be consumed by the USB to SATA bridge to process the second READ command $RC_2$, represented herein as BRcp, is less than the maximum power consumption allowed, represented herein as the parameter "Threshold." At this point in the method of FIG. 6, the total power consumption of the USB mass storage device may be expressed as the sum of the SATA device data transfer power consumption, SDdt, plus the USB to SATA bridge device data transfer power consumption, BRdt. Thus, a representative embodiment of the present invention as shown in FIG. 6 determines, at step 624, whether SDdt+BRdt+BRcp<Threshold.

If, at block 624, it is determined that SDdt +BRdt +BRcp is not less than "Threshold," then the USB to SATA bridge, at block 626, adjusts power consumption of the USB mass storage system by, for example, slowing the processor responsible for processing the second READ command $RC_2$, or throttling the transfer of data for READ command $RC_1$ from the SATA device (e.g., SATA drive(s) 304). The method of FIG. 6 then transitions to block 628.

However, if it is determined, at block 624, that SDdt+ BRdt+BRcp is less than "Threshold," then sufficient additional power is available to process the second READ command $RC_2$ without adjusting power consumption, and the method of FIG. 6 moves to block 628.

At block 628, the USB to SATA bridge begins processing of the second READ command $RC_2$, during which the USB to SATA bridge consumes an amount of power represented herein as BRcp Assuming that the data transfer from the SATA device to the USB host device is ongoing, the power consumption of the USB mass storage system 302 may be expressed as SDdt+BRdt+BRcp. The USB to SATA bridge then waits, at block 630, for completion of processing of the second READ command $RC_2$.

When the method of FIG. 6 determines, at block 630, that processing of the second READ command $RC_2$ is complete, the method of moves to block 632, where the USB to SATA bridge determines whether there is sufficient power available to permit the USB to SATA bridge to send the second READ command $RC_2$ to the SATA device (e.g., SATA drive(s) 304) for processing. At this point in FIG. 6, the total power consumption of the USB mass storage device may be expressed as the sum of the SATA device data transfer power consumption, SDdt, plus the USB to SATA bridge device data transfer power consumption, BRdt. Thus, a representative embodiment of the present invention as shown in FIG. 6 determines, at step 632, whether SDdt+BRdt+SDcp<Threshold.

If it is determined that SDdt+BRdt+SDcp is not less than "Threshold," then sufficient additional power is not available to process the second READ command $RC_2$ at the SATA device 304 without adjusting power consumption, and the USB to SATA bridge 330 then adjusts power consumption of the USB mass storage system 302 by one or both of, for example, delaying sending of the second READ command $RC_2$ to the SATA device until after the data transfer for the earlier READ command $RC_1$ is completed, or by adjusting the transfer of data for READ command $RC_1$ on one or both of the USB link (e.g., USB link 340) side or the SATA bus (e.g., STA bus 325) side of the USB to SATA bridge 330.

If, however, it is determined that SDdt +BRdt +SDcp is less than "Threshold," then sufficient additional power is available to process the second READ command $RC_2$ at the SATA device 304 without adjusting power consumption, and the method of FIG. 6 moves to block 614, where the USB to SATA bridge 330 sends the second READ command $RC_2$ to the SATA device 304, as previously described above.

It should be noted that the values of power consumption during various activities of the USB mass storage system, including those of the USB to SATA bridge (e.g., USB to SATA bridge 330) and SATA device (e.g., SATA drive(s) 304) may be parameters determined during testing in a laboratory or in a manufacturing environment and stored in memory of the USB to SATA bridge, or may be actual measurements made by elements within the USB mass storage system (e.g., USB mass storage system 302) that are part of or connected to the USB to SATA bridge during operation of a USB mass storage system in accordance with a representative embodiment of the present invention.

Aspects of the present invention may be found in a method of limiting power consumption of a first device, where the first device is responsive to commands from a second device. Such a method may comprise determining a maximum allowable power consumption for the first device, receiving, at the first device from the second device, a command to be performed by the first device, and determining an amount of power consumed by the first device during performance of the command. The method may also comprise setting a delay time to a first value, if the amount of power consumed by the first device is less than or equal to the maximum allowable power consumption for the first device, and setting the delay time to a second value, if the amount of power consumed by the first device is greater than the maximum allowable power consumption for the first device. The method may further comprise performing the command at the first device, waiting the delay time, after performance of the command is complete, and transmitting a response for the command, from the first device to the second device, after waiting the delay time.

In a representative embodiment of the present invention, the power consumed by the first device may be provided by the second device, and the maximum allowable power consumption for the first device may be set during establishment of a communication link between the first device and the second device. Determining the amount of power consumed by the first device during performance of the command may comprise estimating the amount of power consumed using at least one parameter specifically corresponding to the command, and may comprise measuring power consumption of at least one portion of the first device during performance of the command. The first device and the second device may communicate according to the Universal Serial Bus 3.0 Revision 1.0 or later specification, the first device may comprise a Universal Serial Bus to Serial ATA bridge, and the first device may comprise a data storage device compliant with the Serial ATA AHCI 1.3 or later specification.

Additional aspects of the present invention may be found in one or more circuits supporting limiting of power consumption in a first device, where the first device is responsive to commands from a second device. Such an embodiment may comprise at least one processor communicatively coupled to the second device. The at least one processor may be operable to, at least, determine a maximum allowable power consumption for the first device, and receive, from the second device, a command to be performed by the first device. The at least one processor may also be operable to determine an amount of power consumed by the first device during performance of the command, and set a delay time to a first value, if the amount of power consumed by the first device is less than or equal to the maximum allowable power consumption for the first device. The at least one processor may set the delay time to a second value, if the amount of power consumed by the first device is greater than the maximum allowable power consumption for the first device. The at least one processor may also perform the command at the first device, wait the delay time, after performance of the command is complete, and transmit a response for the command, to the second device, after waiting the delay time.

In such a representative embodiment, power consumed by the first device may be provided by the second device, and the maximum allowable power consumption for the first device may be set during establishment of a communication link between the first device and the second device. Determining the amount of power consumed by the first device during performance of the command may comprise estimating the amount of power consumed using at least one parameter specifically corresponding to the command, and may comprise measuring power consumption of at least one portion of the first device during performance of the command. The first device and the second device may communicate according to the Universal Serial Bus 3.0 Revision 1.0 or later specification, and the first device may comprise a Universal Serial Bus to Serial ATA bridge. The first device may comprise a data storage device compliant with the Serial ATA AHCI 1.3 or later specification.

Yet additional aspects of a representative embodiment of the present invention may be observed in a computer-readable medium having stored thereon a plurality of code sections, each code section comprising one or more instructions executable by a processor to cause the processing to perform the steps of a method of limiting power consumption of a first device, where the first device is responsive to commands from a second device. The steps of such a method may comprise determining a maximum allowable power consumption for the first device, receiving, at the first device from the second device, a command to be performed by the first device, and determining an amount of power consumed by the first device during performance of the command. The method may comprise setting a delay time to a first value, if the amount of power consumed by the first device is less than or equal to the maximum allowable power consumption for the first device, and setting the delay time to a second value, if the amount of power consumed by the first device is greater than the maximum allowable power consumption for the first device. The method may also comprise performing the command at the first device, waiting the delay time, after performance of the command is complete, and transmitting a response for the command, from the first device to the second device, after waiting the delay time. The maximum allowable power consumption for the first device may be set during establishment of a communication link between the first device and the second device, and determining the amount of power consumed by the first device during performance of the command may comprise estimating the amount of power consumed using at least one parameter specifically corresponding to the command. Determining the amount of power consumed by the first device during performance of the command may comprise measuring power consumption of at least one portion of the first device during performance of the command.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of limiting power consumption of a first device, the first device responsive to commands from a second device, the method comprising:

determining a maximum allowable power consumption for the first device;

receiving, at the first device from the second device, a command to be performed by the first device;

determining an amount of power that would be consumed by the first device during performance of the command;

sending, to the second device from the first device, a response to the command wherein the response signals the second device to transmit an additional command to the first device;

if the amount of power that would be consumed by the first device during performance of the command would be greater than the maximum allowable power consumption for the first device, adjusting the power consumption of the first device wherein adjusting power consumption of the first device includes delaying the transfer of the response to the command; and performing the command at the first device.

2. The method of claim 1, wherein power consumed by the first device is provided by the second device.

3. The method of claim 1, wherein the maximum allowable power consumption for the first device is set during establishment of a communication link between the first device and the second device.

4. The method of claim 1, wherein determining the amount of power consumed by the first device during performance of the command comprises estimating the amount of power consumed using at least one parameter specifically corresponding to the command.

5. The method of claim 1, wherein determining the amount of power consumed by the first device during performance of the command comprises measuring power consumption of at least one portion of the first device during performance of the command.

6. The method of claim 1, wherein the first device and the second device communicate according to the Universal Serial Bus 3.0 Revision 1.0 or later specification.

7. The method of claim 1, wherein the first device comprises a Universal Serial Bus to Serial ATA bridge.

8. The method of claim 1, wherein the first device comprises a data storage device compliant with the Serial ATA AHCI 1.3 or later specification.

9. One or more circuits supporting limiting of power consumption in a first device, the first device responsive to commands from a second device, the one or more circuits comprising:

at least one processor communicatively coupled to the second device, the at least one processor operable to, at least:

determine a maximum allowable power consumption for the first device;

receive, from the second device, a command to be performed by the first device;

determine an amount of power that would be consumed by the first device during performance of the command;

send, to the second device from the first device, a response to the command wherein the response signals the second device to transmit another command to the first device;

if the amount of power that would be consumed by the first device during performance of the command would be greater than the maximum allowable power consumption for the first device, adjust the power consumption of the first device wherein adjusting power consumption of the first device includes delaying the transfer of the response to the command; and perform the command at the first device.

10. The one or more circuits of claim 9, wherein power consumed by the first device is provided by the second device.

11. The one or more circuits of claim 9, wherein the maximum allowable power consumption for the first device is set during establishment of a communication link between the first device and the second device.

12. The one or more circuits of claim 9, wherein determining the amount of power consumed by the first device during performance of the command comprises estimating the amount of power consumed using at least one parameter specifically corresponding to the command.

13. The one or more circuits of claim 9, wherein determining the amount of power consumed by the first device during performance of the command comprises measuring power consumption of at least one portion of the first device during performance of the command.

14. The one or more circuits of claim 9, wherein the first device and the second device communicate according to the Universal Serial Bus 3.0 Revision 1.0 or later specification.

15. The one or more circuits of claim 9, wherein the first device comprises a Universal Serial Bus to Serial ATA bridge.

16. The one or more circuits of claim 9, wherein the first device comprises a data storage device compliant with the Serial ATA AHCI 1.3 or later specification.

17. A non-transitory, computer-readable medium having stored thereon a plurality of code sections, each code section comprising one or more instructions executable by a processor to cause the processing to perform the steps of a method of limiting power consumption of a first device, the first device responsive to commands from a second device, the method comprising:

determining a maximum allowable power consumption for the first device;

receiving, at the first device from the second device, a command to be performed by the first device;

determining an amount of power that would be consumed by the first device during performance of the command;

sending, to the second device from the first device, a response to the command wherein the response signals the second device to transmit another command to the first device;

if the amount of power that would be consumed by the first device during performance of the command would be greater than the maximum allowable power consumption for the first device, adjusting the power consumption of the first device wherein adjusting power consumption of the first device includes delaying the transfer of the response to the command; and performing the command at the first device.

18. The non-transitory, computer-readable medium implemented method of claim 17, wherein the maximum allowable power consumption for the first device is set during establishment of a communication link between the first device and the second device.

19. The non-transitory, computer-readable medium implemented method of claim 17, wherein determining the amount of power consumed by the first device during performance of the command comprises estimating the amount of power consumed using at least one parameter specifically corresponding to the command.

20. The non-transitory, computer-readable medium implemented method of claim 17, wherein determining the amount of power consumed by the first device during performance of the command comprises measuring power consumption of at least one portion of the first device during performance of the command.

21. The method of claim 1, wherein the first device is comprised of a bridge device and a peripheral device wherein the bridge device interfaces with second device and the peripheral device.

22. The method of claim 21, wherein determining an amount of power consumed by the first device during performance of the command includes determining the amount of power required by the bridge device to process the command.

23. The method of claim 21, wherein determining an amount of power consumed by the first device during performance of the command includes determining the amount of power required by the peripheral device to process the command.

24. The method of claim 21, wherein determining an amount of power consumed by the first device during performance of the command includes determining the amount of power required to transfer a response to the command from the peripheral device to the bridge device.

25. The method of claim 21, wherein determining an amount of power consumed by the first device during performance of the command includes determining the amount of power required to transfer a response to the command from the bridge device to the second device.

26. The method of claim 21, wherein adjusting power consumption of the first device is performed by throttling the transfer of a response from the peripheral device to the bridge device.

27. The method of claim 21, wherein adjusting power consumption of the first device is performed by throttling the transfer of a response from the bridge device to the second device.

* * * * *